(12) United States Patent
Birkholz et al.

(10) Patent No.: US 8,469,340 B2
(45) Date of Patent: Jun. 25, 2013

(54) FOOT DEVICE FOR SUPPORTING A SUPPORT DEVICE OR LIFTING DEVICE

(75) Inventors: Holger Birkholz, Faulbach (DE);
Robert Miltenberger, Miltenberg (DE);
Ralf Natterer, Mömlingen (DE);
Gerhard Trunk, Collenberg (DE)

(73) Assignee: Haacon Hebetechnik GmbH, Freudenberg (DE)

( * ) Notice: Subject to any disclaimer, the term of this patent is extended or adjusted under 35 U.S.C. 154(b) by 830 days.

(21) Appl. No.: 12/375,778

(22) PCT Filed: Jul. 12, 2007

(86) PCT No.: PCT/DE2007/001248
§ 371 (c)(1),
(2), (4) Date: Jan. 30, 2009

(87) PCT Pub. No.: WO2008/014747
PCT Pub. Date: Feb. 7, 2008

(65) Prior Publication Data
US 2009/0309332 A1 Dec. 17, 2009

(30) Foreign Application Priority Data

Jul. 31, 2006 (DE) .......................... 10 2006 035 918

(51) Int. Cl.
*B60S 9/02* (2006.01)
*B25B 7/12* (2006.01)
(52) U.S. Cl.
USPC ................. 254/418; 254/424; 280/763.1
(58) Field of Classification Search
USPC ................. 254/413, 424; 280/763.1, 475
See application file for complete search history.

(56) References Cited

U.S. PATENT DOCUMENTS 3,405,955 A * 10/1968 Schuler .................... 280/475
3,751,067 A * 8/1973 Claflin et al. ............. 280/763.1
(Continued)

FOREIGN PATENT DOCUMENTS

DE 3119359 A1 12/1982
DE 3604097 A1 8/1987
(Continued)

OTHER PUBLICATIONS

"PCT International Search Report dated Oct. 4, 2007 for PCT/DE2007/001248," 2 pgs.
(Continued)

*Primary Examiner* — Lee D Wilson
*Assistant Examiner* — Alvin Grant
(74) *Attorney, Agent, or Firm* — Fredrikson & Byron, P.A.

(57) ABSTRACT

A foot device (29) for supporting a support device or lifting device, in particular a semitrailer support or the like, comprising a foot receptacle (31) for connecting a pivoting foot (32) to a support tube (12) of the lifting device (10), wherein the foot receptacle comprises an insertion body (120) for insertion into the support tube, comprising, in two support tube engagement areas spaced apart from one another by a spindle passage area (143) of a lifting spindle (20), bracket receptacles (123,124) for receiving pivoting brackets (130, 131) of the pivoting foot, wherein the pivoting brackets are connected in a captive manner to the insertion body along a pivoting axis (136), and the bracket receptacles comprise counter support faces (133) which are arranged concentrically with respect to the pivoting axis and which, for transmitting the supporting forces, correspond with respective support faces (132) formed by the outer contour of the pivoting brackets.

5 Claims, 2 Drawing Sheets

U.S. PATENT DOCUMENTS

| | | | |
|---|---|---|---|
| 4,824,136 A * | 4/1989 | Bobby | 280/475 |
| 4,863,184 A * | 9/1989 | Mena | 280/475 |
| 5,054,805 A * | 10/1991 | Hungerink et al. | 280/475 |
| 5,435,523 A | 7/1995 | Hying et al. | |
| 6,099,016 A | 8/2000 | Peveler | |
| 6,513,783 B1 * | 2/2003 | Alguera Gallego et al. | 248/677 |
| 6,802,535 B1 * | 10/2004 | Alguera Gallego et al. | 280/763.1 |
| 7,128,340 B1 * | 10/2006 | Alguera Gallego et al. | 280/763.1 |
| 7,207,544 B1 * | 4/2007 | Alguera Gallego et al. | 248/677 |
| 2003/0089898 A1 | 5/2003 | Straw | |
| 2003/0168648 A1 | 9/2003 | Alguera Gallego et al. | |
| 2008/0197332 A1 * | 8/2008 | Siedel et al. | 254/424 |

FOREIGN PATENT DOCUMENTS

| | | |
|---|---|---|
| DE | 19616704 A1 | 10/1997 |
| DE | 19836635 A1 | 2/2000 |
| DE | 19839359 A1 | 3/2000 |
| DE | 19955998 A1 | 5/2001 |
| DE | 20305175 U1 | 9/2003 |
| DE | 102005034554 A1 | 2/2007 |
| EP | 0513973 A | 11/1992 |
| EP | 0688687 A1 | 12/1995 |
| EP | 0845396 A | 6/1998 |
| EP | 0972689 A | 1/2000 |
| EP | 1236630 A1 | 9/2002 |
| EP | 1350701 A1 | 10/2003 |
| EP | 1598304 A | 11/2005 |
| RU | 2220090 C1 | 12/2003 |

OTHER PUBLICATIONS

"PCT International Search Report dated Oct. 12, 2007 for PCT/DE2007/001246," 2 pgs.

"PCT International Search Report dated Dec. 4, 2007 for PCT/DE2007/001247," 2 pgs.

"PCT International Search Report dated Dec. 7, 2007 for PCT/DE2007/001257," 2 pgs.

* cited by examiner

FOOT DEVICE FOR SUPPORTING A SUPPORT DEVICE OR LIFTING DEVICE

RELATED APPLICATIONS

This application is a 35 U.S.C. 371 national stage filing from International Application No. PCT/DE2007/001248 filed Jul. 12, 2007, which claims priority to German Application No. 10 2006 035 918.6 filed Jul. 31, 2006, the teachings of which are incorporated herein by reference.

BACKGROUND OF THE INVENTION

The present invention relates to a foot device for supporting a support device or lifting device, in particular a semitrailer support or the like, comprising a foot receptacle for connecting a pivoting foot to a support tube of the lifting device.

Lifting devices which are provided with foot devices of the type mentioned above are used in the application as semitrailer supports, for example, as height-adjustable support devices for so-called "semitrailers" when they are parked independently from a vehicle. The foot devices, on the one hand, have to perform the task to provide for a safe support face which is, to a large extent, independent from the condition of the subsurface. For this purpose, the foot devices, on the one hand, have to be equipped with an appropriately loadable support face. On the other hand, the foot devices must allow an adjustment to different slopes of the ground.

Of particular importance with respect to the foot devices is the so-called foot receptacle, which establishes a connection of the pivoting foot to the support tube. Since the foot device is hence a component which is arranged between the pivoting foot and the support tube, the design of the foot receptacle is of essential importance for the construction height of the whole lifting device. For the design of an effective lifting device, it is principally desirable to realize a lifting height/construction height ratio which is as high as possible to allow a space-saving accommodation of the lifting device at a maximized lifting height.

Hence it is the object of the present invention to propose a foot device which, due to the design of the foot receptacle, contributes as little as possible to the construction height of the lifting device.

BRIEF SUMMARY OF THE INVENTION

In the foot device according to the invention, the foot device is provided with an insertion body for insertion into the support tube, comprising, in two support tube engagement areas spaced apart from one another by a spindle passage area of a lifting spindle, bracket receptacles for receiving pivoting brackets of the pivoting foot, wherein the pivoting brackets are connected in a captive manner to the insertion body along a pivoting axis, and the bracket receptacles comprise counter support faces which are arranged concentrically with respect to the pivoting axis and which, for transmitting the supporting forces, correspond with respective support faces formed by the outer contour of the pivoting brackets.

Due to the bracket support, unlike the typical support of the prior art, the foot device designed according to the invention allows, by means of a bending resistant axis, a particularly narrow construction of the foot receptacle so that a substantial portion of the foot device, including the force transmission area formed between the pivoting foot and the foot receptacle, can be formed in the area of the foot receptacle implemented as an insertion body. Hence, the portion of the foot receptacle which projects out of the support tube and which influences the construction height of the lifting device can be considerably reduced with respect to its construction height.

When, in addition, the insertion body is formed cup-shaped with a bottom wall and an engagement frame serving for forming the support tube engagement areas, the foot device, dimensioned for a reduced weight, can at the same time form the lower closure of the support tube to seal the support tube interior against penetration of dirt.

When the insertion body is provided with a support collar on its circumferential periphery for abutting against a front end of the support tube, not only a defined relative arrangement with respect to the support tube is provided, but, in addition, the force transmission into the support tube takes place by means of the support collar.

It is particularly advantageous when the bracket receptacles are formed pocket-shaped within the support tube engagement areas so that, in any case, relative movements between the pivoting brackets of the pivoting foot and the inner wall of the support tube, which could allow penetration of dirt into the support tube, can not take place.

It is particularly advantageous for the proper function of the pivoting foot which has an unrestricted pivoting movement in the unloaded condition of the lifting device when the pivoting brackets of the pivoting foot are connected with the support tube engagement areas of the foot receptacle via pin connections free of transverse forces. Hereby it is in fact ensured that pin loads which can result in a deformation of the pin connection area which can also affect the free pivoting of the pivoting foot at the moment of the force transmission, thus at impact of the pivoting foot on the subsurface, do not take place.

Hereinafter, a preferred embodiment of the foot device is explained in more detail by means of the drawings.

BRIEF DESCRIPTION OF THE SEVERAL VIEWS OF THE DRAWING(S)

DETAILED DESCRIPTION OF THE INVENTION

Figure 1:
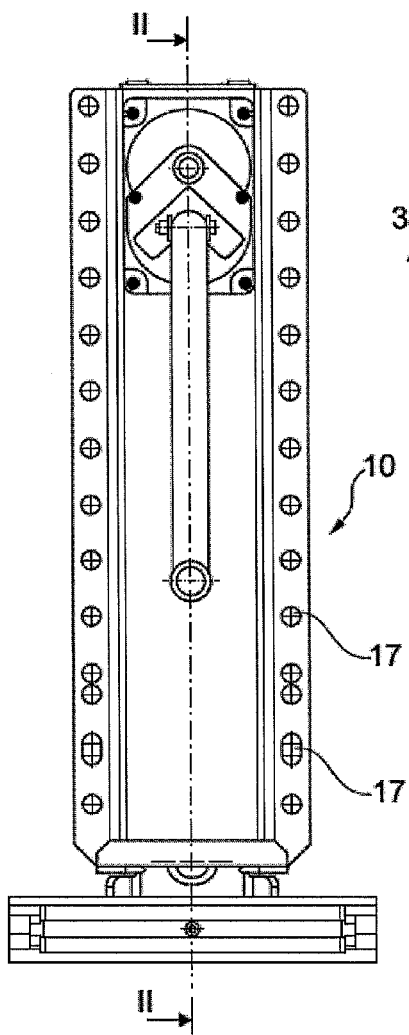
FIG. 1 shows a lifting device with a foot device in a front view.
Figure 2:
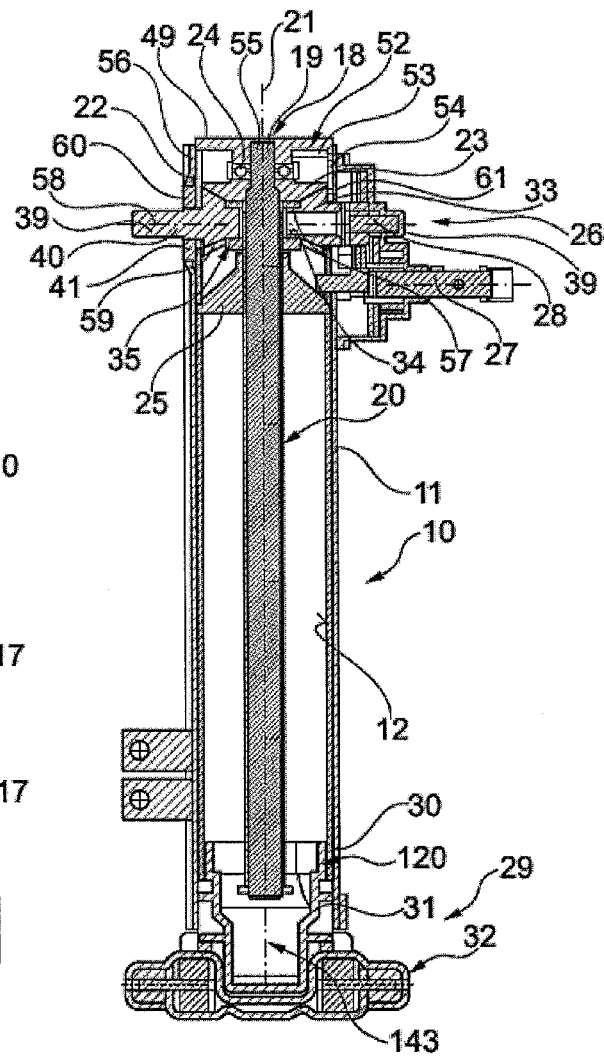
FIG. 2 shows the lifting device illustrated in FIG. 1 in a longitudinal sectional view according to the section line II-II in FIG. 1.
Figure 3:
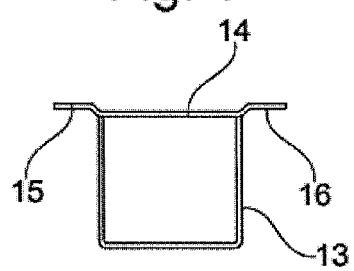
FIG. 3 shows a shank tube of the lifting device illustrated in FIG. 1 in a cross-sectional view.
Figure 4:
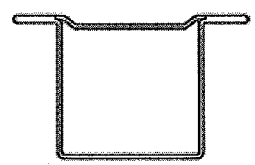
FIG. 4 shows an alternative cross section form of the shank tube cross section illustrated in FIG. 3.

From an overview of FIG. 1 and FIG. 2, the structure of a lifting device 10 comprising a shank tube 11 and a support tube 12 coaxially arranged within the shank tube 11 is apparent. According to the embodiment illustrated in FIG. 3, the shank tube 11 consists of a U-shaped shank tube profile 13 and a mounting plate 14, which completes the profile 13 to form a square tube, and which forms at the same time the back wall of the shank tube 11. The mounting plate 14 serves for connection to a vehicle chassis and, on connection rails 15, 16 formed on the side, comprises a plurality of mounting bores 17 which allow a connection to differently formed vehicle chassis or in different mounting heights on a vehicle chassis, respectively.

As is apparent in particular from the sectional view illustrated in FIG. 2, the support tube 12 received in the shank tube 11 extends substantially over the entire length of the shank tube 11. As is further shown in FIG. 2, as a quasi front-end closure, the shank tube 11 comprises a pressure plate 18, which serves for receiving an upper lifting spindle end 19 of a lifting spindle 20 which extends on a longitudinal axis 21 of the lifting device 10 or the support tube 12, respectively. Furthermore, at the upper lifting spindle end 19, a lifting spindle gearwheel 23 is located, which is arranged torque-proof on a shaft collar 22 and which serves for driving the lifting spindle 20, and, together with the lifting spindle 20, rests against the pressure plate 18 via an axial bearing 24.

Arranged on the lifting spindle 20 is a spindle nut 25, which on its circumference is connected in a rotationally fixed manner with the support tube 12 so that a rotation of the lifting spindle 20, due to a driving of the lifting spindle gearwheel 23 via the thread engagement of the lifting spindle 20 with the spindle nut 25, depending on the direction of rotation, causes an extending or retracting of the support tube 12 out of or into the shank tube 11.

For driving the lifting spindle gearwheel 23 serves a lifting gear mechanism 26 which is arranged below the pressure plate 18 and which comprises an input shaft arrangement 27 and an output shaft arrangement 28 which acts on the lifting spindle gearwheel 23.

At the lower end of the support tube 12, a foot device 29 is located which comprises a foot receptacle 31 connected with the lower front end 30 of the support tube 12 as well as a pivoting foot 32 connected with the foot receptacle 31.

Figure 5:
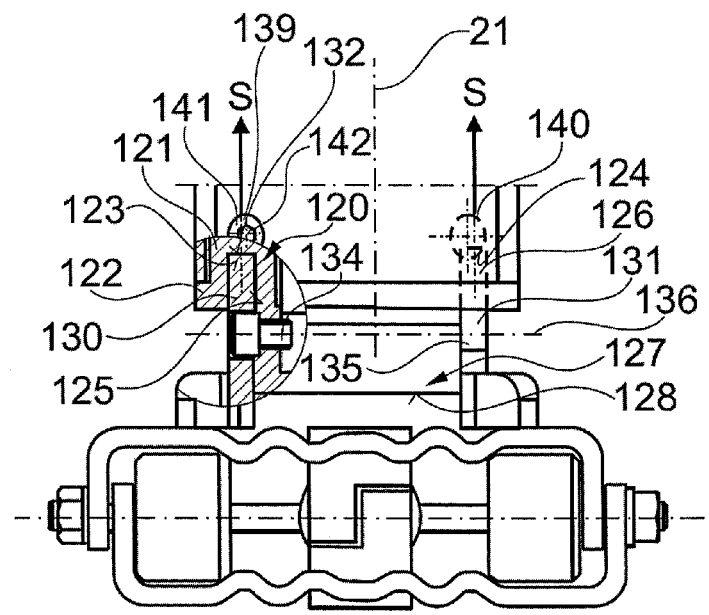
FIG. 5 shows a side view of the foot device illustrated in FIG. 1 according to view V in FIG. 1.
Figure 6:
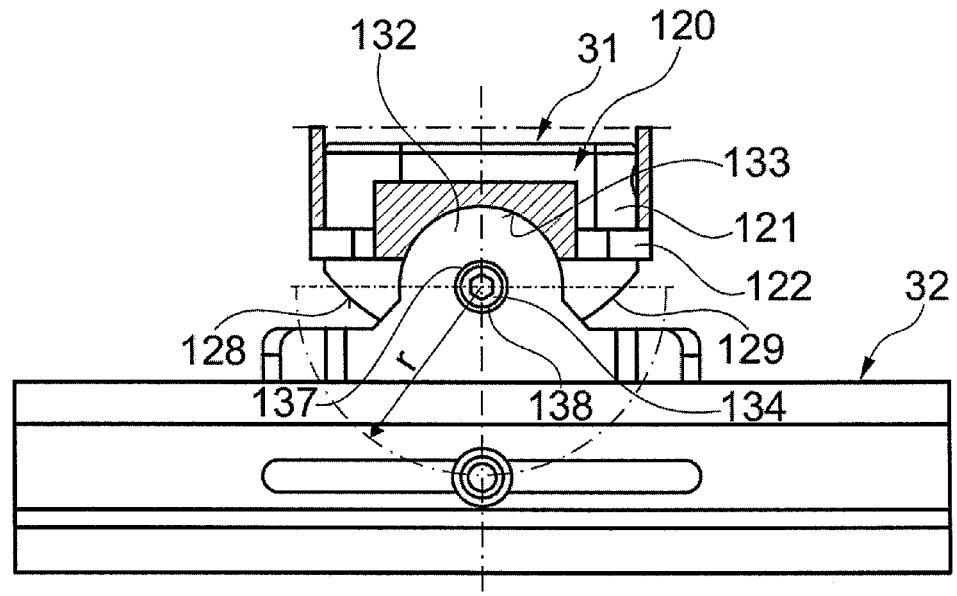
FIG. 6 shows the foot device illustrated in FIG. 5 in a side view.

In FIGS. 5 and 6, the foot device 29 arranged at the lower front end 30 of the support tube 12 is illustrated in detail. It is apparent from the overview of FIGS. 5 and 6 that the foot device 31, with an insertion body 120 which, in the case of the present exemplary embodiment, is formed cup-shaped for forming a spindle passage area 143 (FIG. 2), is inserted into the support tube 12 in such a manner that an engagement frame 121, on the lower end of which a circumferential support collar 122 is formed on the outside, engages with the support tube 12 until the support collar 122 abuts against the front end 30. In two support tube engagement areas, which are arranged opposing one another, of the engagement frame 121, two pocket-shaped, in the case of the present exemplary embodiment approximately disk segment-shaped, bracket receptacles 123, 124 are formed. Bracket receptacle walls, which are facing towards the longitudinal axis 21 of the support tube 12 and which are each arranged parallel to one another, are formed by parallel side walls 125 and 126 of a pivoting foot connection part 127 of the foot receptacle 31 projecting downward from the support tube 12. Between the side walls 125, 126 runs a convex barrel-shaped bottom wall 128, the contour 129 of which is formed corresponding to the pivoting radius r of the pivoting foot 32.

As can be appreciated, in particular due to the illustration according to FIG. 5, the force transmission takes place from the pivoting foot 32, which engages with its pivoting brackets 130, 131 with the bracket receptacles 123 and 124, via convex curved support faces 132, formed by means of the upper edge of the pivoting brackets 130, 131, to the counter support faces 133 of the bracket receptacles 123 and 124, wherein the counter support faces are correspondingly formed concave and are formed by the recess base. The support force S drawn in FIG. 5 is hence transmitted as a pure transverse force from the pivoting foot 32 to the foot receptacle 31.

The pin connections 134, 135 formed between the pivoting brackets 130, 131 and the side walls 125, 126 of the pivoting foot connection part 127 serve only for the captive connection between the foot receptacle 31 and the pivoting foot 32 when the pivoting foot 32 is unloaded, thus when the pivoting foot 32 is lifted from a subsurface. In this support force-free condition, the pin connections 134 and 135 serve also for forming a pivoting axis 136 about which the pivoting foot 32 can pivot for adjusting to a slope of the subsurface at the moment of touching the ground. In the loaded condition of the lifting device 10, the pin connections 134, 135 are free of load since pin bores 137 formed within the pivoting brackets 130, 131 are formed with a diameter which is larger than a pin head 138. For this purpose, the clearance of the pin bore 137 with respect to the pin head 138 is dimensioned in such a manner that, on the one hand, the pivoting brackets 130, 131 can pivot during the operating load-free condition of the lifting device without direct contact to the counter support faces 133 of the bracket receptacles 123, 124, and, on the other hand, that after the pivoting foot 32 touching a subsurface, thus in the loaded condition of the lifting device, a direct contact exists between the support faces 132 of the pivoting brackets 130, 131 and the counter support faces 133 of the bracket receptacles 123, 124.

Also solely for the captive connection of the foot receptacle 31 with the support tube 12 in the operating load-free condition of the lifting device serve pin connections 139, 140, which are provided between the engagement frame 121 of the foot receptacle 31 and the support tube 12 and which therefore also comprise pin bores 141, which are incorporated in the wall of the support tube 12 and which have a larger diameter compared to a pin head 142.

The invention claimed is:

1. A foot device for supporting a support device or lifting device comprising:
   a pivoting foot having a pair of pivoting brackets having support faces formed by an outer contour of the pair of pivoting brackets
   a foot receptacle for coupling the pivoting foot to a support tube of the lifting device, the foot receptacle comprising an insertion body for insertion into the support tube, the insertion body having a pair of bracket receptacles located in two support tube engagement areas spaced apart from one another by a spindle passage area of a lifting spindle, the pair of bracket receptacles receiving the pair of pivoting brackets of the pivoting foot wherein the pivoting brackets are coupled to the insertion body by pin connectors along a pivoting axis, the bracket receptacles having counter support faces that are concentrical with respect to the pivoting axis
   the foot device being configurable in one of a loaded condition and a load-free condition, wherein when the foot device is configured in the loaded condition, the pin connections are free of transverse forces and the counter support faces of the pair of bracket receptacles are engaged with the support faces of the pair of pivoting brackets and when the foot device is configured in the load-free condition, there is no direct contact between the counter support faces of the pair of bracket receptacles with the support faces of the pair of pivoting brackets and the pin connections serve to form a pivoting axis about which the pivoting foot can pivot to adjust to a slope of a subsurface.

2. The foot device according to claim 1, wherein the insertion body is formed cup-shaped with a bottom wall and an engagement frame serving for forming the support tube engagement areas.

3. The foot device according to claim 1, wherein the insertion body is provided with a support collar on its circumferential periphery for abutting against a front end of the support tube.

4. The foot device according to claim 3, wherein the bracket receptacles are formed pocket-shaped within the support tube engagement areas.

5. The foot device according to claim 1, wherein the bracket receptacles are formed pocket-shaped within the support tube engagement areas.

* * * * *